Patented Mar. 11, 1952

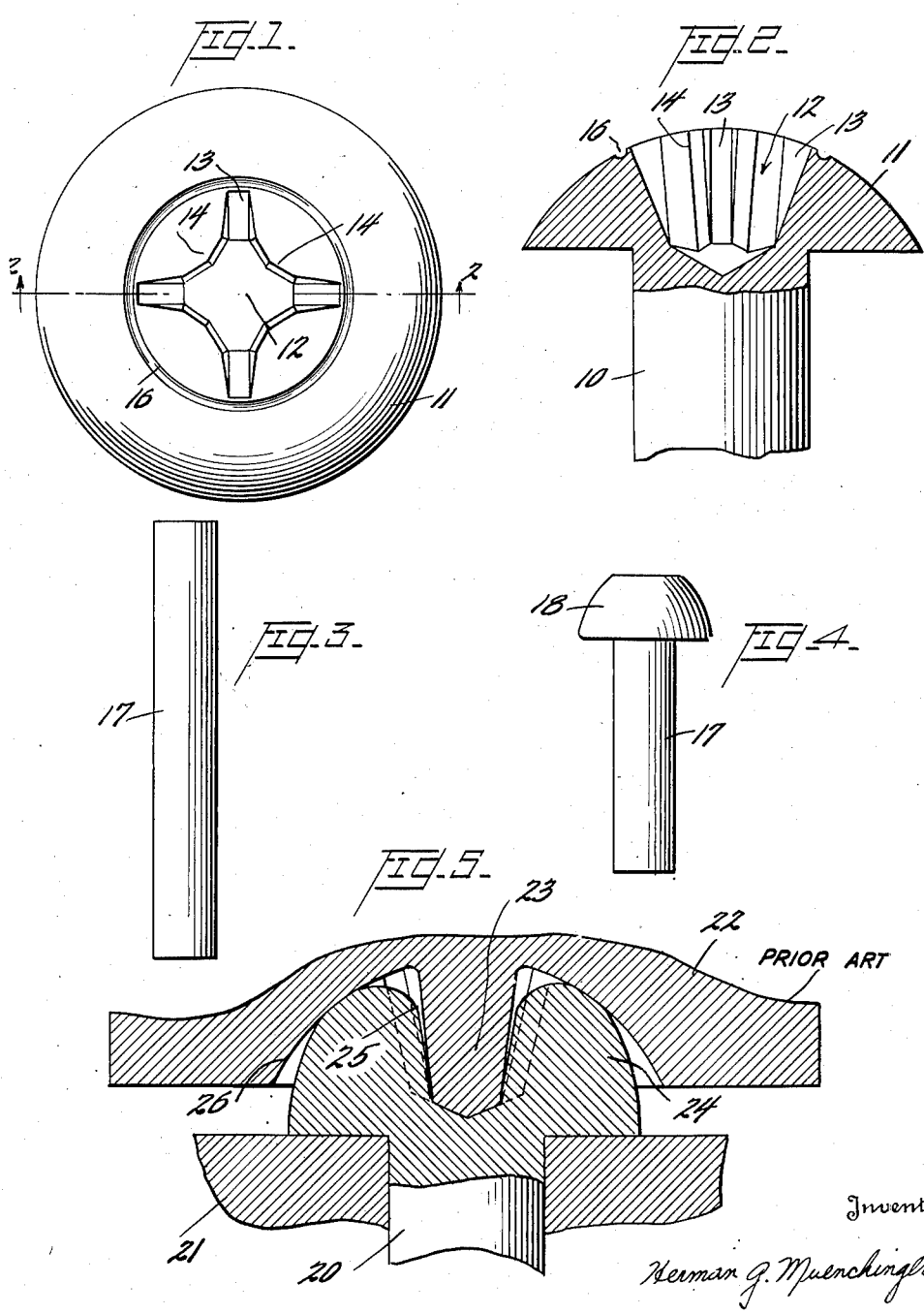

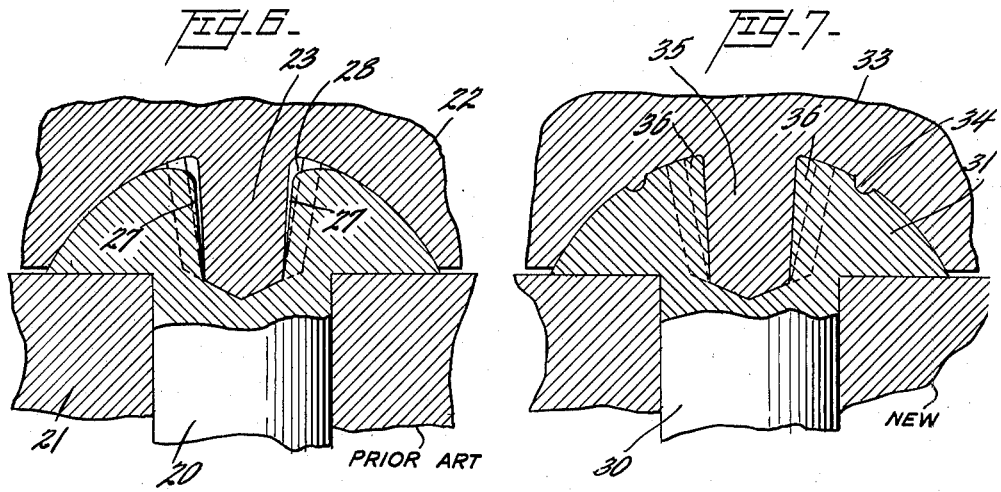
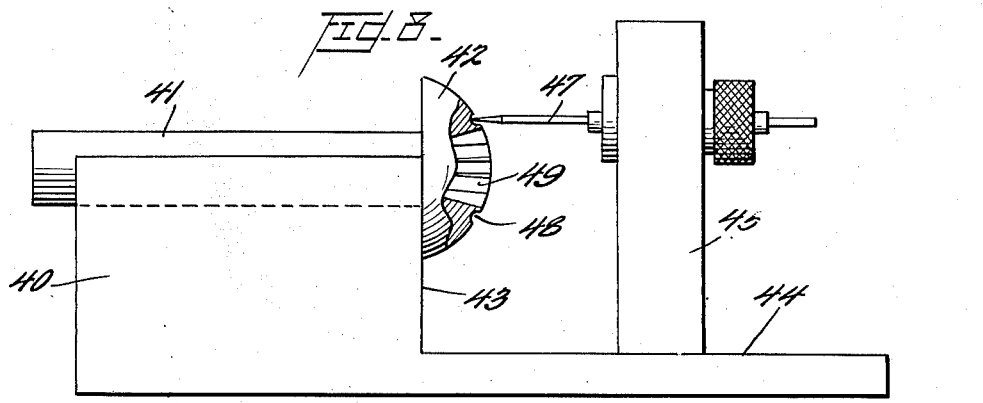
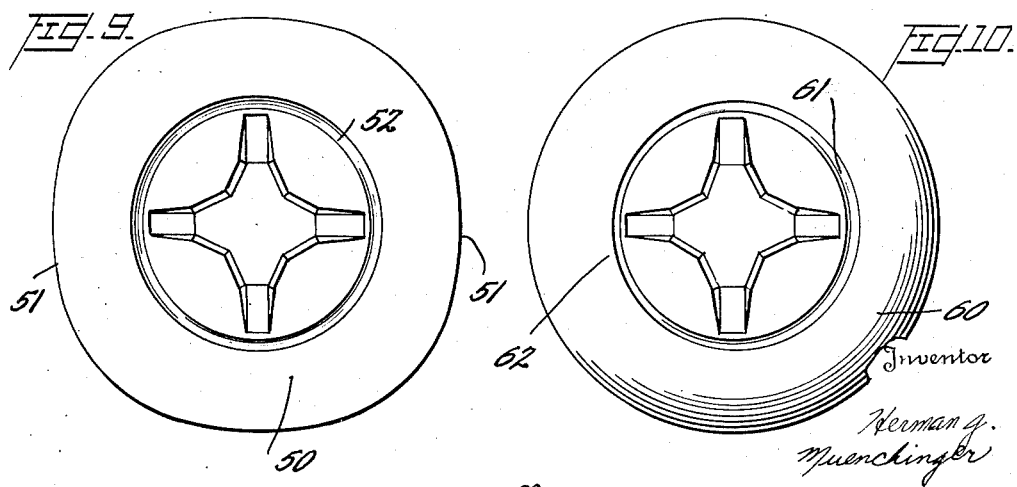

2,588,404

UNITED STATES PATENT OFFICE 2,588,404

FASTENING DEVICE AND METHOD OF MAKING SAME

Herman G. Muenchinger, South Foster, R. I.

Application September 4, 1946, Serial No. 694,715

3 Claims. (Cl. 85—45)

The present invention relates to screws and like fastening devices having a recess in the head thereof for engagement by a cooperatively shaped driving tool.

It is a general object of the present invention to provide a new and improved method of making a recessed screw head of the type shown, for example, in the patent to Phillips et al. 2,046,839, whereby the accuracy of formation of the recess is more positively assured, the desired gripping action between the driver bit and the screw being thus more certainly attained.

More specifically it is an object of the invention to provide an improved method of manufacturing recessed head screws of the Phillips type whereby the recess is formed with a greater degree of accuracy than is obtained by previously known methods, with the result that an improved driving engagement is effected between the cooperating surfaces of the screw recess and the driver bit.

Another object of the invention is to provide a new and improved method of manufacturing recessed head screws whereby the sidewalls of the recess will conform more accurately to the dimensions and slope of the surfaces of the punch from which it is formed.

A further object of the invention is to provide a means on recessed head screws whereby the accuracy of formation of the head and the recess therein may be more readily checked and determined than is the case with recessed head screws as heretofore manufactured.

A further object of the invention is to provide a new and improved recessed head for screws and the like fastening devices whereby the accuracy of alignment of the driver engaging recess may be determined with the aid of a relatively simple checking gauge making possible a reduction in time required for setting up the heading machine.

For a consideration of what is believed novel and inventive, attention is directed to the following description taken in connection with the accompanying drawings, while the features of novelty will be pointed out with greater particularity in the appended claims.

Referring now to the drawings:

In Figure 1 is shown a plan view of a screw head in accordance with one form of the present invention;

Figure 2 is a cross sectional view taken along the line 2—2 of Figure 1;

Figure 3 is a view illustrating a length of wire from which a screw blank is to be formed;

Figure 4 is a view illustrating a partially formed screw blank;

Figure 5 is an explanatory sectional view illustrating a screw head in a heading machine during the progress of the punching stroke;

Figure 6 is a sectional view corresponding to Figure 5 but showing the screw head at the end of the punching stroke;

Figure 7 is a sectional view corresponding to Figure 6 but illustrating the manufacture of a screw head in accordance with the present invention;

Figure 8 is a side elevation, partly in section, illustrating the manner in which recessed head screws constructed in accordance with the present invention may be checked for accuracy of alignment of the recess with the shank;

Figure 9 is a plan view of a recessed flat head screw illustrating a further feature of the present invention; and Figure 10 is a plan view of a defectively made recessed round head screw illustrating a still further feature of the present invention.

Referring now to the drawings, in Figures 1 and 2 a screw is shown in enlarged detail comprising a shank 10 and a head 11 formed on the end thereof, the head being provided with a recess 12 of the type described in greater detail in the Phillips et al. Patent 2,046,839. The recess 12 is of a general cruciform shape in plan and is defined by alternate grooves 13 and intermediate ribs 14 adapted respectively to accommodate vanes and channels on a cooperatively shaped screw driver bit.

A primary advantage derived from the use of screws provided with recesses of the Phillips type resides in the fact that the bit of the driver is held in a centered relation with respect to the screw throughout the driving operation and hence slipping of the driver from the screw and marring of the material into which the screw is driven is prevented. This type of screw has made practical the use of high speed power screw drivers in assembling operations in industry and thus contributed to reduced manufacturing costs very greatly.

A further important feature of this type of screw is that when the recess is accurately formed with relation to the driver bit the screw will adhere to the driver due to frictional engagement between the adjacent surfaces of the recess and the bit. This facilitates the driving operation in that it is not necessary to hold the screw with one hand while manipulating the driver with the other in starting the screw. With one hand thus freed it may be used for positioning the parts which are to be fastened together or for steadying the workpiece into which the screw is driven. Again, the screw driver with the screw attached to the end thereof may be projected into relatively inaccessible locations where it would not be conveniently possible to hold by hand a screw of another type. Firm adherence of the screw onto the driver bit depends to a large degree upon the accuracy of formation of the recess and the driver bit, it being obvious that if there is any play between the cooperating surfaces the screw will fall from the driver if the driver is pointed downwardly. Driver bits for use with recessed screws of the Phillips type are normally manufactured by a milling process so that it is possible to produce then in quantity with a relatively high degree of uniformity and accuracy. The same is not true, however, as regards the manufacture of the screws which are normally produced by punching in a high speed automatic cold forging machine. For reasons to be pointed out more fully hereinafter it is difficult, particularly in the case of certain types of screws, to punch a recess in the head of a screw which will conform accurately to the contour of the punch. Thus even though the punch employed in the formation of the recess is of exactly the same size and shape as the tip of the driver bit, the screw will not always necessarily adhere to the end of the driver.

In accordance with the present invention it is possible to manufacture screws of any type head with a relatively high degree of accuracy whereby the recess will conform to the dimensions and shape of the punch and so that the screw will adhere in an improved manner onto the driver bit thus achieving the full advantages in the use of the Phillips type screws.

A further factor of importance in the manufacture of screws resides in the fact that it is inherently a rather difficult and painstaking procedure to set up the heading machine. Because of the multiplicity of different styles and sizes of screws it is necessary frequently to change the dies and punches of the machines to change over from the manufacture of one style or size to another. Then too, on certain head styles the punches have a relatively short life, due to wear, so that even on continued runs of a certain style or size of screw it is necessary to stop the machine occasionally for the replacement of the worn elements. Obviously every minute of time lost in changing dies and punches and in resetting the machine represents a considerable decrease in plant output and hence an ultimate increase in the cost of the product. With increasing labor costs careful attention must be directed to the matter of maintenance of production rates at maximum possible levels in order to insure minimum cost to the user.

While cold forging heading machines have been developed to a high degree of mechanical perfection they are nevertheless difficult to set up and adjust when changing from one style or size of screw to another. The setting up procedure depends to a very large degree upon the skill of the machine operator since the final adjustments are made by trial and error methods, that is, following each minor adjustment a number of screws are produced, which are then checked for defects. Because of the complex shape of the Phillips type recess it is difficult to check the accuracy of its formation with ordinary tools or gauges. Moreover the cost of checking or inspecting individual recesses under present manufacturing methods would be prohibitive. Therefore, the defects are frequently not detected prior to usage of the screws by the consumer at which time such defects are usually manifested either by excessive bit wear or by failure of the screw head. The nature and cause of these defects will be pointed out more fully hereinafter as well as the manner in which they are overcome by the present invention.

Referring now again to the drawings, the present invention consists in the provision of a circular groove 16 around the recess 12 and which is formed in the head simultaneously with the punching of the recess by the provision of a raised annular bead on the surface of the punching die around the base of the punch portion. The raised bead on the punch comes into play at the end of the punching stroke and serves to more accurately form the recess as will be described in connection with the explanatory views of Figures 3 to 7, inclusive.

In Figure 3 is shown a section 17 of straight wire from which the screw blank is formed and in Figure 4 is shown a partially formed blank following the first shaping operation in which one end of the section 17 of wire is upset as indicated at 18 preparatory to the recess punching step. The type of screw shown in the present drawings is known as a truss head. In this type, as well as in the case of binding head, fillister head, and certain other types of screws, the underside of the head makes a 90° angle with the axis of the screw shank or in other words, the anvil in which the blank is held during the punching operation is flat and without any concavity or depression adjacent the blank. In such cases there is comparatively little resistance to the lateral flow of the metal as the punch penetrates the partially formed head, and what is known as a "plowing" action may take place, as seen in Figure 5.

In Figure 5 the screw blank 20 is shown held in the anvil 21 and with a conventional head forming punch 22 illustrated in a position approximately midway of its penetration of the upset end portion 24 of the screw blank. Due to the force of impact of the punch nib 23 the metal of the screw head tends to move away from the punch nib 23 as indicated at 25, particularly along the planes between the wings of the punch. As the punch proceeds to its limit position, the curved walls 26 of the punch will force the metal somewhat back against the punch nib 23 but, in many cases, not sufficiently to fill up all of the spaces therebetween. Thus while the shape of the recess formed will conform generally to the shape of the punch nib the upper portions of the sidewalls of the recess may nonetheless be spaced somewhat from the adjacent surfaces of the punch nib as indicated by the spaces 27 in Figure 6 which illustrates the punch 22 in the lower limit position. Furthermore, the uppermost corners of the ribs of the recess may be spaced considerably from the uppermost corners of the punch as indicated at 28. It will be obvious that if, in such cases, a driver is used having a bit shaped identically with the punch nib 23 then the bit will contact with the recess only along the lower portion thereof. The driving torque will therefore be concentrated toward the lower portions of the bit vanes and will result in excessive wear of the bit at such points. The edges of the bit vanes may become rounded within a relatively short period of use and as soon as this occurs the useful life of the driver is ended.

In Figure 7 is shown a view corresponding to that of Figure 6 but illustrating a screw blank 30 with the head 31 being formed thereon in accordance with the present invention. The punch 33 is in this case provided with an annular bead 34 surrounding the base of the punch nib 35. As the punch 33 is driven to its lowermost position the bead 34 upon being forced into the upper surface of the screw head causes a corresponding displacement of the metal immediately adjacent the upper end of the recess. Such displacement of metal will tend to occur first in the direction toward the nib because of the smaller mass of metal required to be moved in that direction and in doing so will tend to fill up any spaces which might exist thereabout. Thus the metal which may initially have been thrown away from the punch projection by the force of impact is in the final position of the punch swaged back against the surface of the punch projection so that upon withdrawal of the punch the recess left in the head of the screw blank will conform accurately to the shape and dimensions of the punch. It will be obvious that if the driver bit is of the same shape and size as the punch projection 35 then the driver bit will fit snugly into the screw recess with a sufficient frictional resistance therebetween for causing firm adherence of the screw onto the end of the driver. Furthermore, in view of the fact that the upper extremities of the ribs 36 of the screw recess are completely and accurately formed, surfaces of maximum area are provided for engagement by cooperating vanes of the driver bit. The total torque force is therefore distributed uniformly over relatively large areas of the sidewalls of the screw recess instead of being concentrated at points of limited area. The driver bit life is thus increased to a maximum with no undue wear created by faulty formation of the screw recess.

It is not essential that the bead 34 surrounding the base of the nib 35 be circular in shape for effecting a swaging of the metal of the head back toward the punch since such swaging may be effected by relatively low protuberant portions of other shape provided in the punch head adjacent the edge of the recess to be formed. It is preferred, however, to make the bead circular in shape because of other and independent advantages which are accomplished by the circular marking thus formed upon the head of the screw surrounding the recess.

Equally important to the formation of a recess conforming exactly to the dimensions of the punch is the matter of forming the recess concentrically with the shank of the screw blank. Due to the irregular shape of the recess it is inherently difficult to measure the concentricity relative to the shank with any ordinary tools. With cumbersome laboratory equipment such a determination may be made but it is impractical for the machine operator to take samples of screws following each minor adjustment to the laboratory for checking because of the long delay or long shut down period which would be necessitated. Because of the fact that the groove 16 is concentric with the recess the circular groove forms a convenient reference marking against which the accuracy of alignment of the recess itself may be checked. For example, in Figure 8 is illustrated a simple tool or gauge which may be carried in the pocket of the machine setter and which may be used with excellent results. This gauge consists of a block 40 having a longitudinal V-notch in its upper surface for cooperatively receiving the shank 41 of a screw the head 42 of which overhangs the forward edge of the block 40 and is adapted to engage against the forward wall 43 thereof as shown. The block 40 is provided with a forward extension 44 and an upstanding bracket 45 within which is adjustably mounted a gauge needle 47. A screw selected for checking is positioned in the V-notch of the block 40 and the point of the needle 47 is adjusted so that the end of it projects into the groove 48 formed in the upper surface of the screw head 42 surrounding the recess 49. The screw is then slowly rotated within the V-notch and if the point of the needle follows in the groove 48 throughout a complete revolution of the screw then the concentricity of the groove with the shank of the screw is determined. This also establishes the fact that the longitudinal axis of the recess 49 coincides identically with the longitudinal axis of the screw blank. If, on the other hand, the recess is eccentrically formed in respect to the shank 41 then the point of the gauge needle will climb out of the groove upon rotation of the screw blank. By insertion of the end of the gauge into the bottom of the groove 48 the eccentricity of the screw head will be evidenced by a binding action which will occur between the end of the gauge needle and the sidewall of the groove 48 as the screw blank is rotated. This binding action may readily be noted by the sense of touch making it unnecessary to visually observe the relation between the end of the gauge needle and the groove as the screw blank is turned.

Moreover, eccentricity of the head, as a whole, to the screw shank may be more easily observed by virtue of groove 48, since if the head is eccentric while the recess is concentric, the variation in the spacing of the groove from the periphery of the head will be readily apparent.

While the foregoing description has been made with particular reference to round headed screws it will be apparent to those skilled in the art that the invention is not to be necessarily so limited in that the advantages following from the present invention are inherent irrespective of the particular size or shape of the screw head, although they are of greater importance in connection with certain types as pointed out above.

Certain defects may be more prominent is some types of screws than in others. For example, in the manufacture of flat headed screws there is a certain tendency for the peripheral edge of the screw head to be flattened. Figure 9 is a plan view illustrating a flat headed type of screw 50 the peripheral edge of which though normally intended to be perfectly circular is flattened in certain portions as indicated at 51. When manufactured according to prior practice and without the circular groove 52 the defective peripheral edge can readily escape visual detection because of the optical illusion created by the cruciform plan shape of the recess and the peripheral edge of the head. By the provision of the circular groove surrounding the recess the variations in distance between the groove and the peripheral edge becomes readily noticeable.

A further defect which may be readily observed by visual inspection is one created by lack of parallelism between the longitudinal axis of the punch and the longitudinal axis of the shank of the screw blank. It is extremely difficult to detect such a defect in a screw manufactured according to prior practice but it may readily be determined by mere visual inspection of the screw head when formed according to the present invention. In Figure 10 is illustrated in plan view a screw head defectively made, which is indicated by the fact that the circular groove 61 is of greater depth at one side of the screw head 60 than at the other side 62. This variation in depth is clearly indicated by the greater width of the groove at the deeper side than at the shallower side. This clearly indicates that the longitudinal axis of the punch extends at an angle inclined with respect to the longitudinal axis of the shank and upon the observance of such defect compensation may readily be made by proper adjustment of the heading machine.

Having described the invention in what are considered to be certain preferred embodiments thereof it is desired that it be understood that the specific details shown are merely illustrative and that the invention may be carried out by other means.

Having thus described the invention, what is claimed as new and desired to be secured by Letters Patent is:

1. A screw having a relatively deep punched recess of generally cruciform plan in the head thereof, and a relatively shallow circular groove punched in said head simultaneously with the punching of said recess, at least some of the side walls of said recess lying in planes substantially parallel to the longitudinal axis of said recess, said groove being concentric with said axis and relatively closely adjacent the outermost portions of said recess, and said groove being concentric with the shank of said screw.

2. The method of manufacturing screws and like fastening devices having recesses of cruciform plan punched in the head thereof, comprising driving a recess forming punch into the upset end of the screw blanks, and toward the end of the punching stroke punching an annular second recess, concentric to the axis of said first recess, into the upper surface of the partially formed head for forcing the side walls of the first recess into firm engagement with the surface of the punch, and then checking the alignment of said first recess with the longitudinal axis of the screw blank by determining the concentricity of said second recess with the shank of said blank.

3. The method of punching recesses of generally cruciform plan in the heads of screws and like devices which comprises driving a recess forming punch into the upset end of the screw blanks, and toward the end of the punching stroke punching a second recess into the upper surface of the partially formed head for forcing the sidewalls of the first recess into firm engagement with the surface of the punch.

HERMAN G. MUENCHINGER.

REFERENCES CITED

The following references are of record in the file of this patent:

UNITED STATES PATENTS

| Number | Name | Date |
| --- | --- | --- |
| 1,244,125 | Parish | Oct. 23, 1917 |
| 1,946,800 | MacLean | Feb. 13, 1934 |
| 2,046,839 | Phillips | July 7, 1936 |
| 2,125,272 | Erdman | Aug. 2, 1938 |
| 2,151,776 | Koester | Mar. 28, 1939 |
| 2,213,630 | Gade | Sept. 3, 1940 |
| 2,285,462 | Purtell | June 9, 1942 |
| 2,366,394 | Gerber | Jan. 2, 1945 |
| 2,408,689 | Seme | Oct. 1, 1946 |